Dec. 27, 1955

W. C. SONNTAG
POWER DRIVEN MEANS FOR SUPPLYING
FEED AND SIMILAR MATERIALS 2,728,469

Filed May 5, 1951

INVENTOR.
WOLFGANG C. SONNTAG
BY
Leon M. Strauss
AGT.

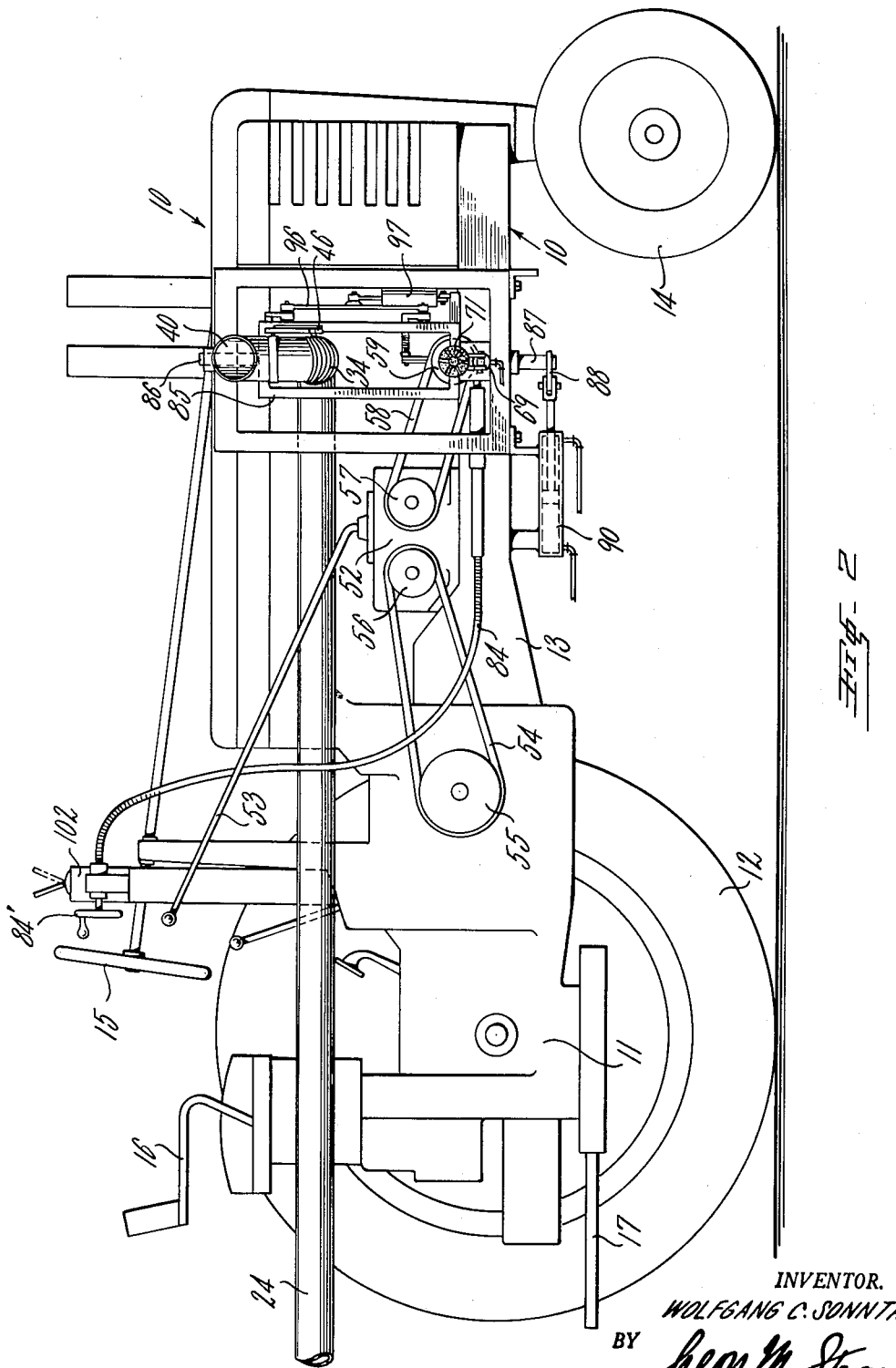

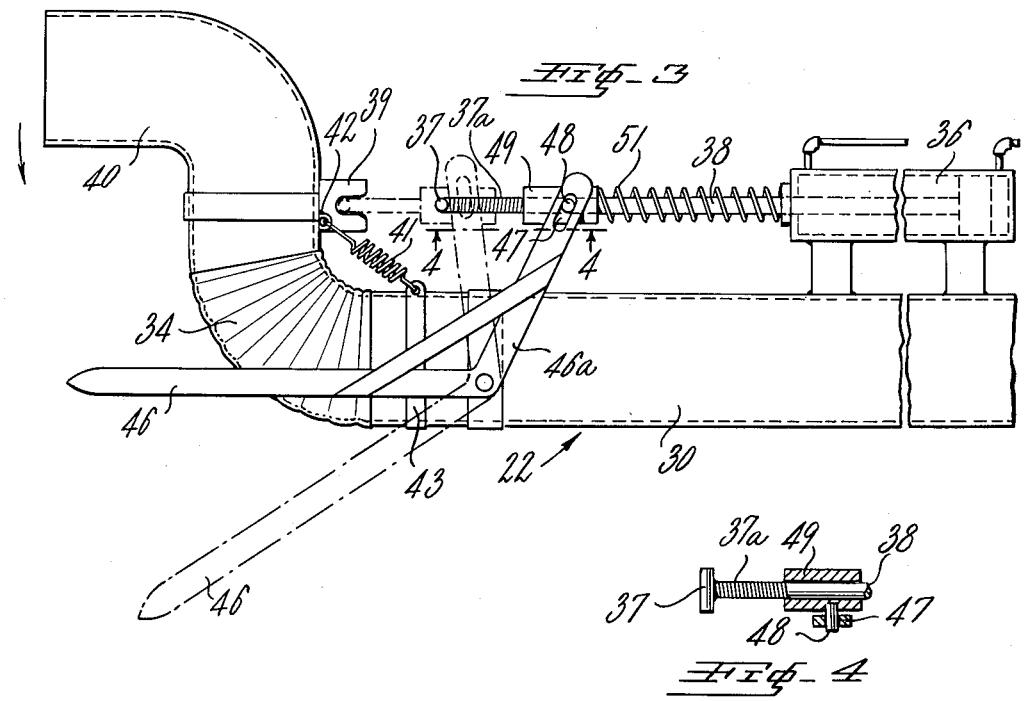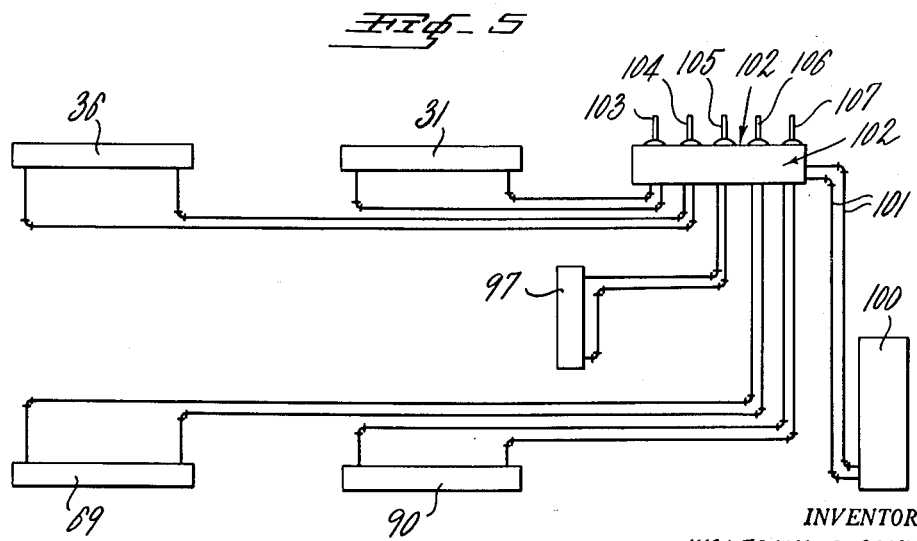

Dec. 27, 1955
W. C. SONNTAG
POWER DRIVEN MEANS FOR SUPPLYING
FEED AND SIMILAR MATERIALS
Filed May 5, 1951
2,728,469
4 Sheets-Sheet 4
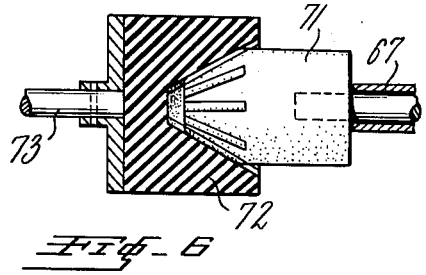
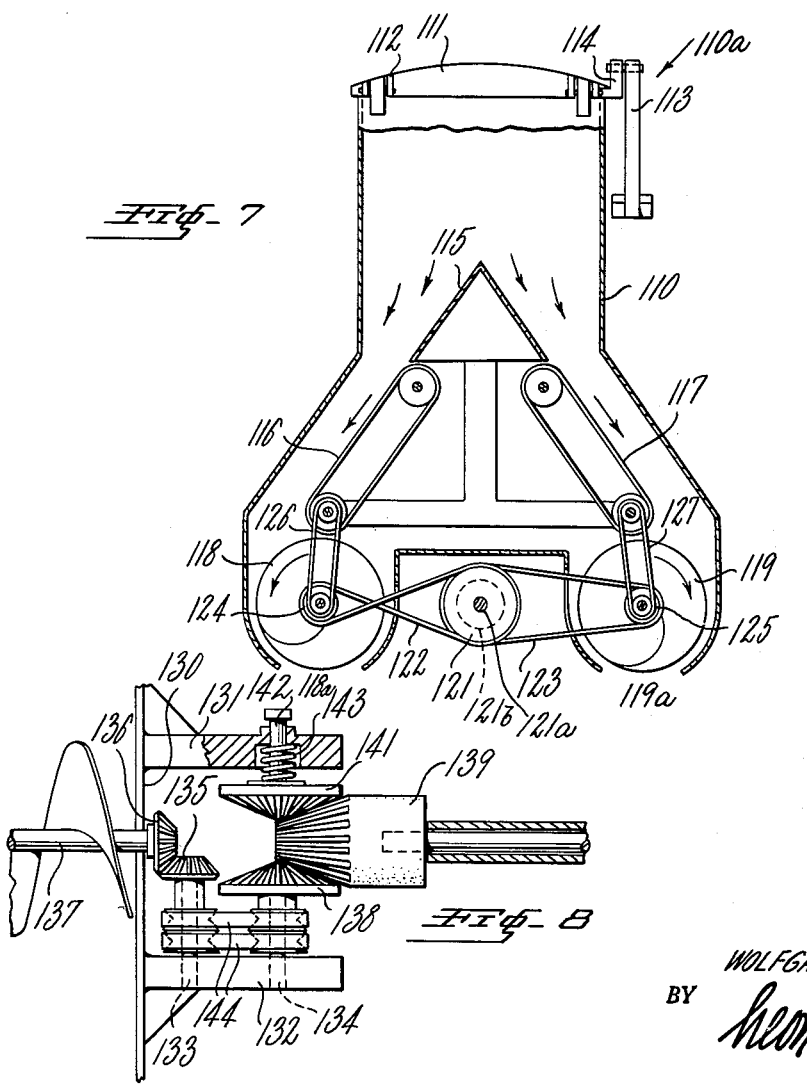
INVENTOR.
WOLFGANG C. SONNTAG
BY

United States Patent Office 2,728,469
Patented Dec. 27, 1955

2,728,469

POWER DRIVEN MEANS FOR SUPPLYING FEED AND SIMILAR MATERIALS

Wolfgang C. Sonntag, New York, N. Y.

Application May 5, 1951, Serial No. 224,761

2 Claims. (Cl. 214—17)

This invention relates to vehicle mounted power driven material supply means for fertilizer and lime distributors, for automatically operated feeders of live stock and poultry and similar devices.

It is a primary object of this invention to provide means affording considerable reduction in labor and cost of transportation of feed or similar material from a storage or supply source to a feeder or similar material or feed handling station at which the supplied material is finally dispensed or the feed becomes accessible in predetermined quantities to live stock of any kind.

It is another object of the invention to provide means facilitating convenient supply and distribution of feed for live stock, poultry and the like from a storing or loading station and the elimination of containers, such as bags or sacks, which heretofore necessitated considerable labor in filling and handling the same, the feed being received in bulk and taken from a wagon, truck or storage station, which will be preferably moved from one feeder to the other for supply purposes.

It is another object of the invention to provide means insuring speedy supply, replenishment and delivery and clean, hygienic transportation of feed from a storage or similar station to the feed dispensing station.

It is a further object of the invention to provide means contributing to a considerable improvement in handling and operating of feed and similar material between the storage thereof and the distributing station therefor, without regard whether the storage and distribution of the feed are to occur indoors or outdoors.

It is a still further object of the invention to provide means permitting the supply of material including feed, sand, corn, and similar granular material, as well as chopped feed material of grass, hay, straw, and the like from a storage station to a distributing and feeding station in a very economical, time-saving and efficacious manner, whereby female help may readily be employed and wherein it is unnecessary for the operator of the tractor or truck to leave the same in order to provide the connection with the feeder for driving its conveyor and for the delivery of the feed or granular material thereto.

It is a still further object of the invention to provide material supply means adapted to be directly connected to a tractor in such a manner as to extend laterally therefrom and so as to be manipulated by controls on the tractor for the purpose of establishing a driving connection with the feeder and for locating the delivery spout on the feeder without the necessity of the operator leaving the tractor so that time is saved in the delivery of the material from one station to another.

Yet a further object of the invention resides in the provision of means insuring adjustment, coupling and disengagement of said driving connection with the conveyor of the feeder or similar material handling device.

A still further object of the invention is to provide means affording the arrangement of tubular feed and like material supply means in juxtaposition to driving means whereby the supply means as well as the driving means can be operated independently from each other although the same are connected together and attached to a common support on one side of a tractor or similar power station, while a pump aggregate is disposed at the other side of the tractor to substantially balance the weight on the tractor and to facilitate surveyance and maintenance of the hydraulically operated adjusting devices for the supply means and driving means.

Other objects of the invention are to provide self-contained feed delivery or supply means adapted for attachment to tractors or trucks to direct feed to feed distributors and at the same time to give power to the feed distributor so that the feed may enter the latter from the delivery spout of the supply device, which is of simple constructions, easy to manipulate, preferably hydraulically controlled, is compact, durable, and consumes relatively small space and is efficient in operation.

For a better understanding of the invention reference may be had to the following detailed description taken in connection with the accompanying drawings, in which:

Fig. 2 is a side elevational view of the tractor and of a part of the supply device mounted on one side of said tractor.

Fig. 3 is an enlarged fragmentary view of the spout and operating mechanism therefor.

Fig. 4 is a detailed fragmentary and sectional view taken on line 4—4 of Fig. 3.

Fig. 5 is a diagrammatic view of the hydraulic system employed for manipulating the spout and the drive means for the feed handling mechanism to which feed is delivered.

Fig. 6 is an enlarged sectional view of the clutch element of the feeder for connection with the drive shaft of the supply means.

Fig. 7 is partly a vertical section through a material receiving hopper and a material handling mechanism in modified form, which may be applied to fertilizer or lime spreaders, large self-feeders and the like.

Fig. 8 is an elevational view of a modified form of drive means for the feeder handling mechanism.

Figure 1:
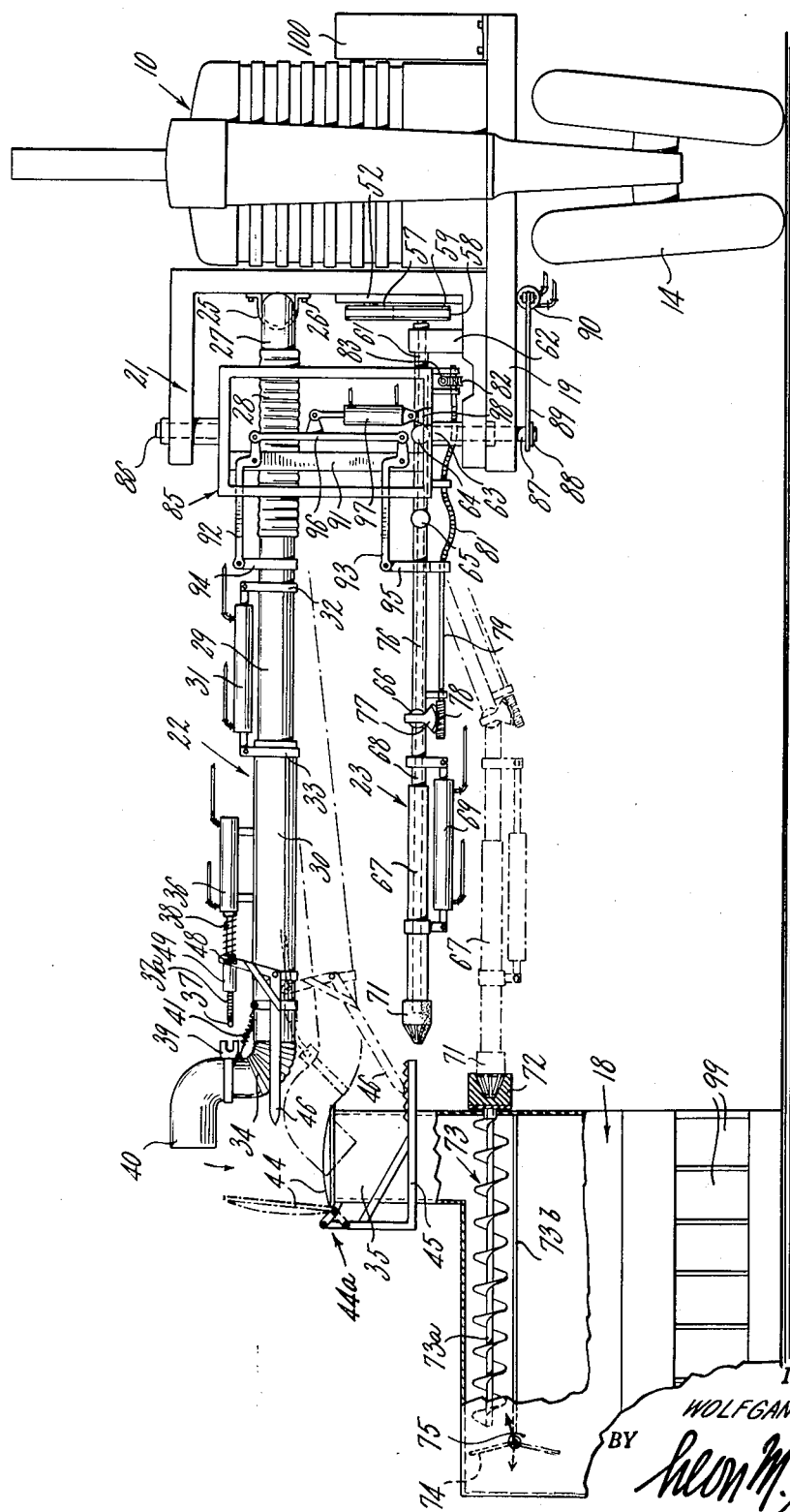
Fig. 1 is a front elevational view of a tractor and a side elevational view of the material supply means for connection with a feeder showing one form of a material handling mechanism equipped with a receiving hopper therefor.

Referring now to the drawings, 10 represents a tractor having a rear axle housing 11 with rear supporting and drive wheels 12. The tractor has further a forwardly extending frame 13 with side plates for the attachment of implements thereto and a dirigible wheel arrangement 14 connected to the forward end thereof which arrangement is operable by a steering wheel 15 from an operator's seat 16 disposed on the rear axle of the tractor.

The tractor 10 has a drawbar 17 below the operator's seat, which drawbar extends from the rear axle housing 11 to which a wagon (not shown) forming the storage station for the feed or similar material may be connected. This wagon is adapted to contain the feed or like material in bulk and is movable together with the tractor.

It is, however, well understood that stationary storage or like source may be operatively connected with the supply means according to the invention as will appear from the ensuing specification.

According to the present invention, there has been provided means for receiving the feed from the wagon or similar storage station and for supplying and delivering the feed to feeders 18 which may be disposed at different locations upon a ranch or in a building in which different live stock or poultry is accommodated.

While the supply means has been shown as an attachment to a tractor, it is to be understood that such supply means can be directly associated with a truck filled with the feed or granular material.

The supply means or device according to the present invention, has an attaching member 19 which can be fixed to the under side of the forwardly extending frame 13. To this attaching member 19 there is connected a U-shaped frame 21 as shown in Fig. 1, to which a spout mechanism 22 is connected for manipulation thereof laterally from the tractor and also a drive mechanism 23 operated by the motor of tractor 10 and disposed below the spout mechanism 22.

A supply pipe 24 extends forwardly from a wagon or similar storage station (not shown) to which pipe a blower is operatively connected and further a pick up feed device (not shown) whereby the feed or other material will be picked up within such wagon and forced under pressure through the pipe 24 and supplied to the spout mechanism 22. The forward end of the pipe 24 is supported on a U-shaped bracket 25 secured by screws 26 to the frame 21. A tubular elbow piece 27 has a flexible and extensible tube 28 connected therewith. This flexible tube permits universal movement of the spout mechanism. The spout mechanism 22 includes further telescoping pipe sections 29 and 30 which are adjustable relative to each other by a two-way hydraulic device 31 connected by brackets 32 and 33 to the respective pipe sections.

On the end of the pipe 30 there is arranged a flexible and adjustable spout portion 34 which can be swung toward a hopper-like housing 35 of the feeder 18. A hydraulic device 36 is mounted on the pipe 30 and has an extensible T-shaped element 37 connected to a piston rod 38 of the hydraulic device 36, which will engage a slotted bracket 39 to force downwardly the spout nose 40 against the action of return spring 41 which is connected between a lug 42 on the bracket 39 and a ring bracket 43 on the pipe 30. The flexible tube portion 34 permits the adjustment of the spout nose 40 with respect to hopper 35. This spout nose may be shaped to dip into the hopper housing 35 of the feeder 11 in the following manner:

Cover 44 of the hopper housing 35 may be opened by the downward movement of an operating arm 46 connected to a lever 46a which is operated by the piston rod 38 of the hydraulic device 36. Lever 46 when swung in downward direction together with the spout nose 40 comes into abutting engagement with an arm 45 in the manner illustrated in Fig. 1 and lifts automatically cover 44 through a link connection 44a extending between arm 45 and cover 44. The lever 46a has an elongated slot 47 receiving a pin 48 which is carried upon a sleeve 49 on the piston rod 38 (Fig. 4) which in turn is held in an advanced position by a compression spring 51 on piston rod 38 of the hydraulic device 36.

Consequently forward movement of piston rod 38 against spring 51 entails downward movement of arm 46 and engagement of element 37 with bracket 39 against action of spring 41. While pivoted lever 46 is operating against arm 45 to open cover 44 the spout nose 40 follows subsequently with the further advance of piston 38 and is forced by the strong, tightly wound coil spring rod 37a to tilt downwardly toward the open end of the hopper 35.

On the tractor frame 13 there is arranged a speed transmission 52 which is operated by a lever 53 extending toward the steering wheel 15 and the operating seat 16. This transmission 52 is driven by a power take-off pulley 55 and belt 54 extending over a transmission pulley 56.

A pulley output 57 of the transmission or gear box 52 drives a pulley belt 58 that extends over a pulley 59 on a power shaft 61 journalled in upstanding bearing supports 62 and 63 on the supporting frame 21.

The drive device 23 includes a plurality of shaft sections connected together by universal joints 64, 65 and 66. These joints connect together different sections or lengths of the shaft assembly and a telescoping shaft section 67 is adjustable upon shaft section 68.

This adjustment is effected by a hydraulic device 69 whereby the shaft section 67 can be shifted and extended. The shaft section 67 has an engaging clutch head 71 adapted to engage with a yieldable clutch receptacle 72 forming part of the feed handling mechanism 73 of the feeder 18.

This mechanism includes a screw conveyor 73a for uniformly distributing the material laterally through the feeder and to discharge the feed material through an elongated bottom slot 73b from where said feed enters the individual bins or openings 99.

A valve gate 74 is provided at the end of the conveyor 73a, which gate is opened under the pressure of the feed material which after all bins 99 are filled is actuated laterally through further feed material transported by screw conveyor 13a. The changes of position of the valve gate may be visualized by an outside indicator 75.

A suitable spring 74a will return the valve gate 74 to starting position when the aforesaid pressure is released and the feeder 18 needs replenishment.

Fixed between the shaft section 68 and the shaft section 76 is an adjusting segment 77 with which a worm 78 engages. This worm is operated by a shaft 79 and a flexible shaft 81.

This flexible shaft 81 has a worm wheel 82 which is driven by a worm 83 connected to a flexible shaft 84 (Fig. 2) extending rearwardly along the tractor to the operator's seat. At this latter location, there is provided a crank wheel 84' which can be actuated for adjustment by the operator of the tractor.

As this adjustment is effected, it will be seen that the drive shaft device 23 can be raised and lowered in order to center the clutch head or drive end 71 in proper position to enter the feeder drive receptacle 72 (indicated in dot and dash lines in Fig. 1).

Within the fixed frame 21 there is disposed a movable frame 85 which extends between the ends of the frame 21 on upper and lower pin projections 86 and 87 received, respectively, in the arms of the frame 21. The pin 87 extends downwardly through attaching bar 19 and has a crank arm 88 that is connected by a link 89 to a hydraulic device 90 mounted upon the frame 13 of the tractor. It will be seen that the inner frame 85 can be adjusted angularly with the devices 22 and 23 which are attached to the same and may be swung to be telescopically extended or to be retracted with respect to the tractor 10.

A vertically extending member 91 is connected to the frame 85 and supports the bell crank levers 92 and 93, respectively. The bell crank lever 92 is connected by a bracket 94 to the pipe 29. The bell crank 93 is connected by a bracket 95 to the shaft length 76 of the drive device 23. The bell cranks 92 and 93 are connected together by a link 96 and to this link there is connected a double acting hydraulic device 97. This hydraulic device 97 is connected to a bracket 98 at the bottom of the frame 85. Accordingly, as the double acting device 97 is adjusted, the drive shaft and spout devices can be elevated or lowered.

Referring now particularly to Fig. 5, the hydraulic system is utilized in the following manner according to the invention: This system comprises an oil pump aggregate 100 attached at the other side of the tractor and is operated by a drive connection with the tractor engine. Oil will be delivered through piping 101 to a dash controlled arrangement 102 having valve elements 103, 104, 105, 106 and 107 for controlling, respectively, spout operating cylinder 36, the extension cylinder 31, the raising and lowering of the feed pipe and drive shaft by cylinder 97, drive shaft extending cylinder 69 and the horizontally moving cylinder 90.

Each of the cylinders are double acting so that oil delivered under pressure to one end will be returned for delivery to the pump 100 from the opposite end of the device. The dash control arrangement is located on the tractor in close proximity to the operator's seat 16. Pairs of pipes extend between the control box 102 and the respective hydraulic devices. Besides the gear shift lever 53 for the transmission 52 there are also available at the operator's seat the crank wheel 84' for controlling the end of the clutch element 71 for bringing about engagement with the rubber or like coupling receptacle 72 of the feeder device.

In Fig. 7 there is shown a modified material handling mechanism 110a which is preferably used in connection with lime and fertilizer distributors or spreaders. This mechanism is actuated in the same manner as feeder 18 and has a casing 110a having a cover 111 hinged to the upper end of the casing. Hinge formations 112 facilitate movement of the cover which is operated by a lever system 113 connected to a crank arm 114 of the cover. Lever system 113 is actuated in the same manner as lever system 45 of feeder 18. A diverting member 115 is disposed within the casin g110 so that lime or fertilizer material will be directed according to the arrows outwardly to the opposite sides of the casing 110.

The aforesaid material is further moved downwardly by conveying belts 116 and 117 and delivered, respectively, to spaced screw conveyors 118 and 119. These screw conveyors are driven from a drive pulley 121 which has belts 122 and 123 connected to it and extending, respectively, to pulley elements 124 and 125 on the respective screw shafts. Belt pulleys 126 and 127, respectively, connect with the conveying belts 116 and 117 in order to drive the same.

The belt 122 is reversed so that the arrangements at the respective opposite sides of casing 110 will drive and direct the material downwardly and in the same direction toward slots of openings 118a, 119a.

Drive shaft 121a has a clutch receptacle 121b similar to the receptacle 72 hereinabove referred to and into which the clutch head 71 may extend for driving this mechanism 110a, when fertilizer or similar material is being discharged through spout mechanism 22 into casing 110.

In Fig. 8 there is shown an alternate form of effecting the drive connection of the drive shaft device with a feeder or similar material handling device. A housing 130 of the feeder has brackets 131 and 132. The bracket 132 has upwardly extending shafts 133 and 134. Bevel gear 135 on the shaft 133 meshes with bevel gear 136 which drives screw conveyor 137. Large bevel gear 138 receives a pinion gear 139 of the drive device and bevel gear 141 on stub shaft 142 acting by means of spring 143 forces the pinion 139 on to gear 138. Drive pulley belts 144 are connected between pulleys on the respective shafts 133 and 134 and connected, respectively, with the bevel gears 135 and 138.

It will be obvious that this drive connection is more flexible than the aforesaid connection 71—72 preferably employing a rubber clutch receptacle 72.

It will now be apparent that there has been provided feed or like material supply means adapted for connection to tractors, trucks and the like wherein there is adequate control of the spout device 22 and the drive device 23 from the tractor so that the operator need not get off the tractor to make the connections with feeders which are generally located at the different stations and whose screw conveyors for the delivery and distribution of the material are simultaneously to be driven by the drive device 23. It will also be apparent that there has been provided a delivery spout device 22 and a drive device mounted on a common frame that can be pivoted with respect to the tractor and out of the way at times while the tractor is moving over the ground.

While various changes may be made in the detail construction, it shall be understood that such changes shall be within the spirit and scope of the invention as defined by the appended claims.

Having thus described the invention, what is claimed as new and desired to be secured by Letters Patent, is:

1. A feed and like material supply arrangement adapted to be mounted upon and operated from a vehicle to supply said material to a feeder, comprising material delivery spout means terminating in a flexible spout end, a drive device terminating in an adjustable drive end, power means operated from said vehicle and including a device for actuating said drive end and said spout end and said drive end to depress the latter for delivery of material in a downward direction, and a lever mounted adjacent said spout end and adapted to operate the cover of said feeder to open said cover in advance of depressing of the spout end, so that the latter extends into the feeder upon removal of said cover and said drive end being adapted to drive said feeder for displacing said material therein.

2. A feed and like material supply arrangement for attachment to and operation from a power means-equipped vehicle to supply said material to a feeder having a feed handling mechanism and a swingable cover; comprising frame means mounted on said vehicle, a spout mechanism, a drive mechanism connected to said power means of said vehicle, said spout mechanism and said drive means being pivotally mounted on said frame means and in superposed relation to each other, said spout mechanism terminating in a flexible spout end, said drive mechanism including means operatively connecting said power means through said drive mechanism with said feed handling mechanism of said feeder, and means mounted adjacent said flexible spout end and adapted to operate and swing the cover of said feeder to open position in advance of the insertion of said spout end into said feeder.

References Cited in the file of this patent

UNITED STATES PATENTS

| | | |
|---|---|---|
| 623,109 | Schuman | Apr. 11, 1899 |
| 901,490 | Sellers | Oct. 20, 1908 |
| 2,401,152 | Hagen | May 28, 1946 |